United States Patent
Yum et al.

(10) Patent No.: US 11,082,138 B2
(45) Date of Patent: Aug. 3, 2021

(54) METHOD FOR CHANNEL STATE MEASUREMENT IN WIRELESS COMMUNICATION SYSTEM AND APPARATUS THEREFOR

(71) Applicant: LG Electronics Inc., Seoul (KR)

(72) Inventors: Kunil Yum, Seoul (KR); Kijun Kim, Seoul (KR); Jiwon Kang, Seoul (KR); Haewook Park, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/499,712

(22) PCT Filed: Mar. 28, 2018

(86) PCT No.: PCT/KR2018/003644
§ 371 (c)(1),
(2) Date: Sep. 30, 2019

(87) PCT Pub. No.: WO2018/182306
PCT Pub. Date: Oct. 4, 2018

(65) Prior Publication Data
US 2020/0036457 A1    Jan. 30, 2020

Related U.S. Application Data

(60) Provisional application No. 62/479,328, filed on Mar. 31, 2017.

(51) Int. Cl.
*H04B 17/309* (2015.01)
*H04L 5/00* (2006.01)

(52) U.S. Cl.
CPC ......... *H04B 17/309* (2015.01); *H04L 5/0048* (2013.01)

(58) Field of Classification Search
None
See application file for complete search history.

(56) References Cited

U.S. PATENT DOCUMENTS

| 2011/0110444 | A1* | 5/2011 | Roh | H04B 7/0626 |
| | | | | 375/260 |
| 2013/0301434 | A1 | 11/2013 | Krishnamurthy et al. | |
| 2019/0364492 | A1* | 11/2019 | Azizi | H04W 52/0264 |

FOREIGN PATENT DOCUMENTS

| EP | 2701424 | 2/2014 |
| KR | 20160083083 | 7/2016 |

(Continued)

OTHER PUBLICATIONS

Japanese Office Action in Japanese Application No. 2019-553371, dated Aug. 4, 2020, 4 pages (with English translation).

(Continued)

*Primary Examiner* — Christine T Duong
(74) *Attorney, Agent, or Firm* — Fish & Richardson P.C.

(57) ABSTRACT

A method for a channel state measurement in a wireless communication system according to an embodiment of the present disclosure is performed by a terminal, and may comprise the steps of: receiving a resource setting related to a reference signal for the channel state measurement from a base station; receiving information related to the number of transport layers of the base station at the time of the channel state measurement or the number of transport layers of the base station at the time of scheduling on the basis of the channel state measurement; and performing the channel state measurement by using the received information.

11 Claims, 9 Drawing Sheets

(56) References Cited

FOREIGN PATENT DOCUMENTS

| KR | 20170018046 | 2/2017 |
| WO | WO2016044848 | 3/2016 |

OTHER PUBLICATIONS

LG Electronics, "Discussion on CSI framework," R1-1704880, 3GPP TSG RAN WG1 Meeting #88bis, Spokane, USA, dated Apr. 3-7, 2017, 7 pages.

ZTE, ZTE Microelectronics, "Beam selection and CSI acquisition for NR MIMO," R1-1700147, 3GPP TSG RAN WG1 NR Ad-Hoc Meeting, Spokane, U.S.A., dated Nov. 16-20, 2016, 6 pages.

3rd Generation Partnership Project; Technical Specification Group Radio Access Network; "Evolved Universal Terrestrial Radio Access (E-UTRA); Physical layer; Measurements (Release 14)," 3GPP TS 36.214 V14.2.0, dated Mar. 23, 2017, 24 pages.

PCT International Search Report in International Application No. PCT/KR2018/003644, dated Aug. 23, 2018, 21 pages (with English translation).

CATT, "On interference measurement enhancement for multi-user MIMO operation," R1-162286, 3GPP TSG RAN WG1 Meeting #84bis, Busan, Korea, dated Apr. 11-15, 2016, 5 pages.

EP Extended European Search Report in European Appln. No. 18776852.8, dated Dec. 23, 2020, 11 pages.

Ericsson, "Discussion on Interference Measurement Enhancements," R1-167642, 3GPP TSG-RAN WG1#86, Gothenburg, Sweden, dated Aug. 22-26, 2016, 6 pages.

NTT Docomo, "Advanced CSI Reporting and Interference Measurements," R1-165203, 3GPP TSG RAN WG1 Meeting #85, Nanjing, China, dated May 23-27, 2016, 4 pages.

NTT Docomo, "On CSI measurement for NR," R1-1705722, 3GPP TSG RAN WG1 Meeting #88bis, Spokane, USA, dated Apr. 3-7, 2017, 7 pages.

\* cited by examiner

METHOD FOR CHANNEL STATE MEASUREMENT IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2018/003644, filed on Mar. 28, 2018, which claims the benefit of U.S. Provisional Application No. 62/479,328, filed on Mar. 31, 2017, the contents of both are incorporated by reference herein in their entirety.

TECHNICAL FIELD

The present disclosure relates to a wireless communication system, and more particularly, to a method for channel state measurement and apparatus therefor.

BACKGROUND ART

The necessity for mobile broadband communication much improved than the conventional radio access technology (RAT) has increased as a number of communication devices has required higher communication capacity. In addition, massive machine type communications (MTC) capable of providing various services anytime and anywhere by connecting a number of devices or things to each other has been considered as a main issue in the next generation communications. Moreover, a communication system design capable of supporting services sensitive to reliability and latency has been discussed. The introduction of next-generation RAT considering enhanced mobile broadband communication (eMBB), massive MTC (mMTC), ultra-reliable and low latency communication (URLLC), etc. has been discussed. In the present disclosure, the corresponding technology is referred to as new RAT for convenience of description.

DISCLOSURE

Technical Problem

The object of the present disclosure is to provide a method for channel state measurement. Specifically, the present disclosure provides a method for performing channel state measurement by considering a difference between channel states at measurement and scheduling times.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided herein is a channel state measurement method in a wireless communication system. The method is performed by a user equipment (UE) and may include receiving, from a base station, a resource configuration related to a reference signal for channel state measurement, receiving information on the number of transmission layers of the base station at a channel state measurement time or the number of transmission layers of the base station at a scheduling time based on the channel state measurement, and performing the channel state measurement using the received information.

Additionally or alternatively, the number of transmission layers may include the number of transmission layers for a desired channel or signal for the UE, the number of transmission layers for an interference signal for the UE, or the number of total transmission layers used by the base station for transmission.

Additionally or alternatively, the information on the number of transmission layers may be received together with downlink control information for triggering the channel state measurement or interference measurement.

Additionally or alternatively, the method may further include, when a frequency division multiplexed demodulation reference signal is used as the reference signal, receiving information on a resource on which the channel state measurement is to be performed among resources for the frequency division multiplexed demodulation reference signal. In this case, each of the resources for the demodulation reference signal may be configured for each port for the demodulation reference signal.

Additionally or alternatively, the method may further include receiving, from the base station, information on the number of frequency division multiplexed resources for interference measurement.

Additionally or alternatively, the information on the number of transmission layers may be provided for each antenna port on which the reference signal is transmitted or for each frequency division multiplexed resource.

In another aspect of the present disclosure, provided herein is a UE for performing channel state measurement in a wireless communication system. The UE may include a transmitter, a receiver, and a processor configured to control the transmitter and the receiver. The processor may be configured to receive, from a base station, a resource configuration related to a reference signal for the channel state measurement, receive information on the number of transmission layers of the base station at a channel state measurement time or the number of transmission layers of the base station at a scheduling time based on the channel state measurement and perform the channel state measurement using the received information.

Additionally or alternatively, the number of transmission layers may include the number of transmission layers for a desired channel or signal for the UE, the number of transmission layers for an interference signal for the UE, or the number of total transmission layers used by the base station for transmission.

Additionally or alternatively, the information on the number of transmission layers may be received together with downlink control information for triggering the channel state measurement or interference measurement.

Additionally or alternatively, when a frequency division multiplexed demodulation reference signal is used as the reference signal, the processor may be configured to receive information on a resource on which the channel state measurement is to be performed among resources for the frequency division multiplexed demodulation reference signal. In this case, each of the resources for the demodulation reference signal may be configured for each port for the demodulation reference signal.

Additionally or alternatively, the processor may be configured to receive, from the base station, information on the number of frequency division multiplexed resources for interference measurement.

Additionally or alternatively, the information on the number of transmission layers may be provided for each antenna port on which the reference signal is transmitted or for each frequency division multiplexed resource.

Additionally or alternatively, the UE is a part of an autonomous driving device and the UE is communicating with at least one of a network or an autonomous driving vehicle.

The above-described aspects of the present disclosure are merely parts of the embodiments of the present disclosure. It will be understood by those skilled in the art that various embodiments are derived from the following detailed description of the present disclosure without departing from the technical features of the disclosure.

Advantageous Effects

According to the present disclosure, a UE can efficiently perform downlink reception.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

BEST MODE

Figure 1:
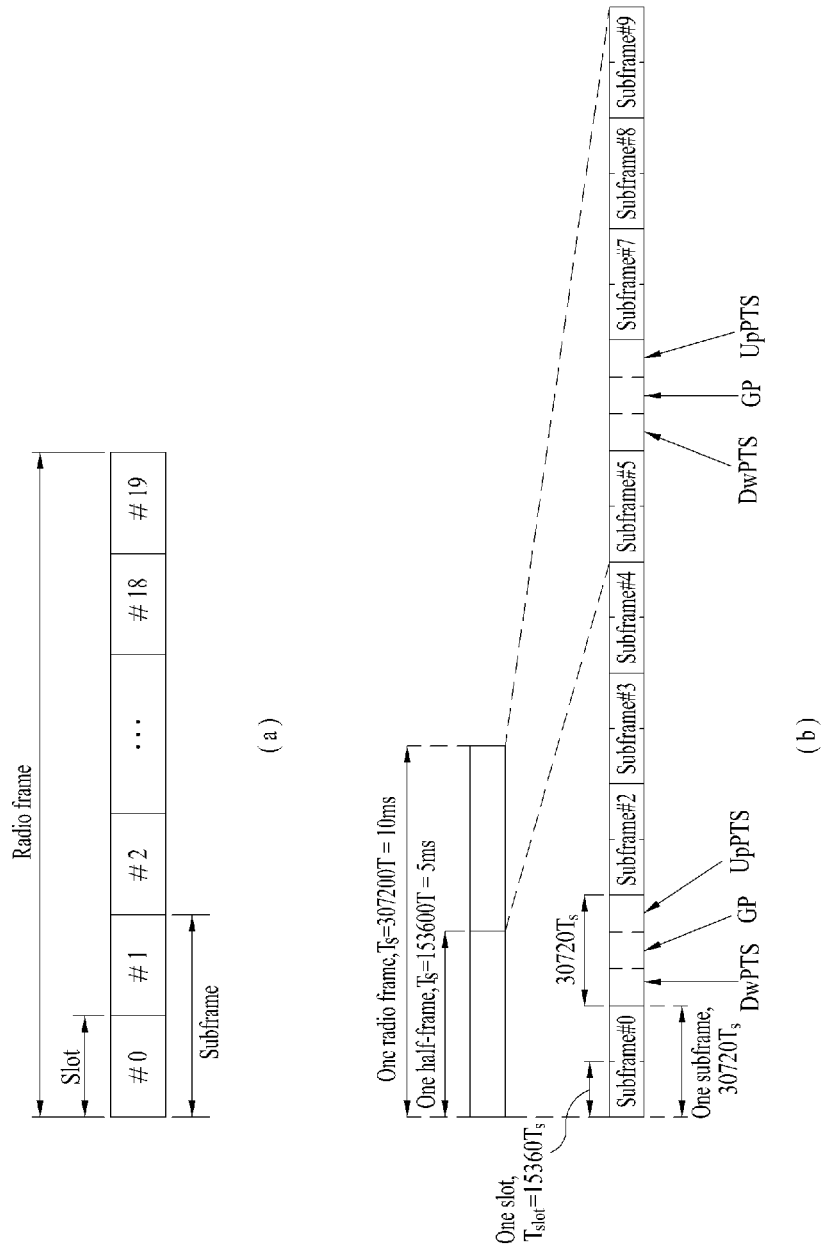
FIG. 1 is a diagram for an example of a radio frame structure used in a wireless communication system.

Reference will now be made in detail to the preferred embodiments of the present disclosure, examples of which are illustrated in the accompanying drawings. The accompanying drawings illustrate exemplary embodiments of the present disclosure and provide a more detailed description of the present disclosure. However, the scope of the present disclosure should not be limited thereto.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present disclosure, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present disclosure, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present disclosure, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present disclosure with respect to a method of performing coordinated data transmission using some or all nodes can be applied to various types of multi-node systems. For example, a node refers to an antenna group spaced apart from another node by a predetermined distance or more, in general. However, embodiments of the present disclosure, which will be described below, can even be applied to a case in which a node refers to an arbitrary antenna group irrespective of node interval. In the case of an eNB including an X-pole (cross polarized) antenna, for example, the embodiments of the preset disclosure are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present disclosure, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present disclosure, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present disclosure, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |

TABLE 1-continued

| DL-UL config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot Time Slot), GP (Guard Period), and UpPTS (Uplink Pilot Time Slot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
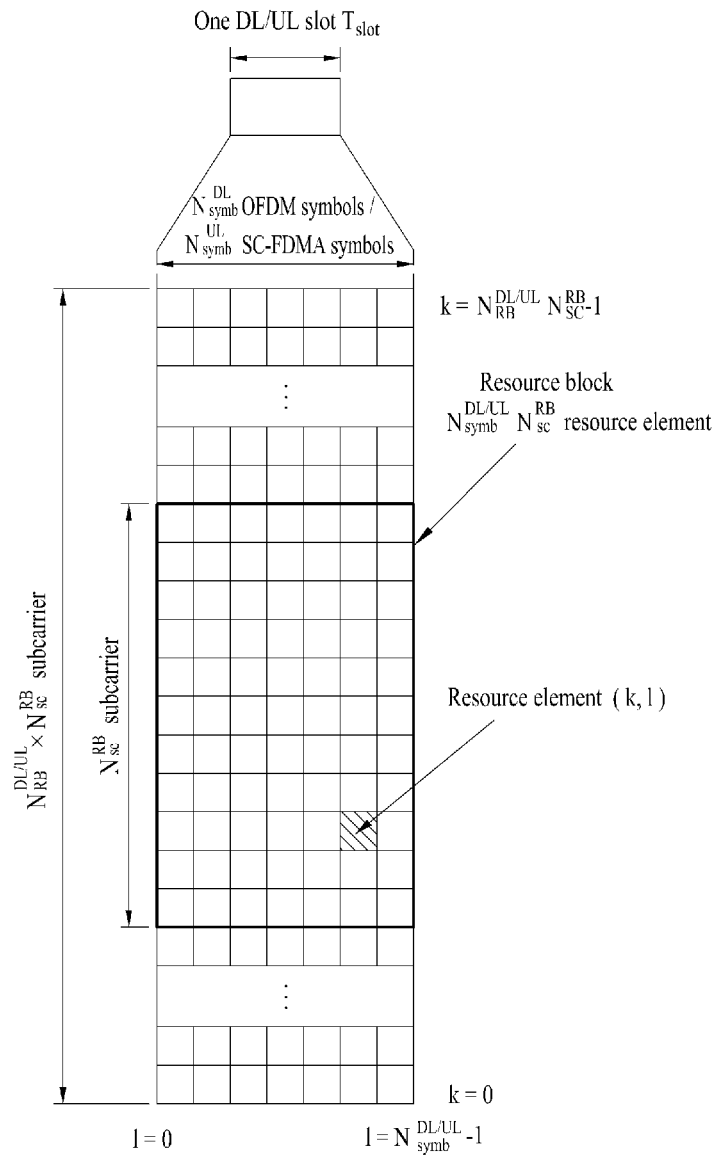
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present disclosure can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB} = n_{VRB}$ is obtained. Numbers are given to the localized VRBs from 0 to $N_{VRB}^{DL} - 1$ and $N_{VRB}^{DL} = N_{RB}^{DL}$ obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
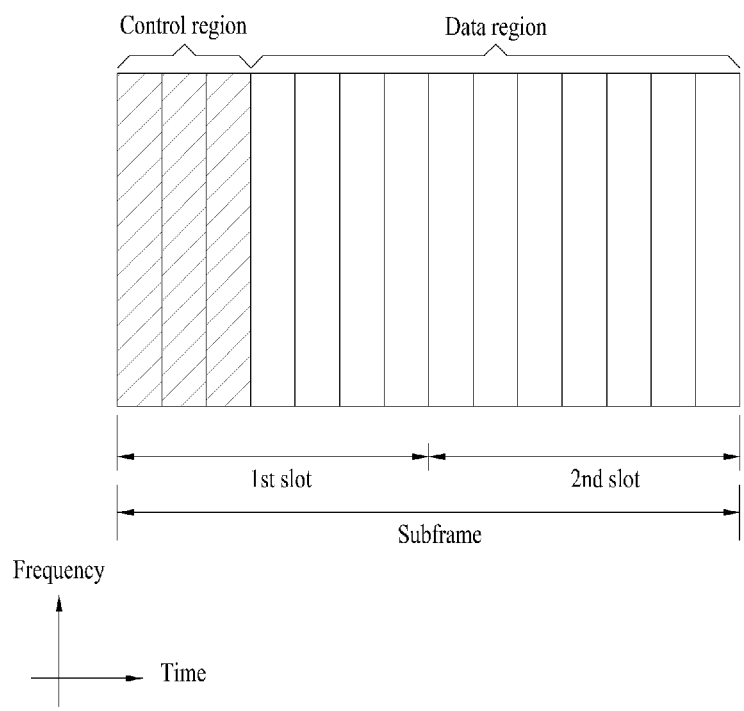
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| | Search Space | | |
|---|---|---|---|
| Type | Aggregation Level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
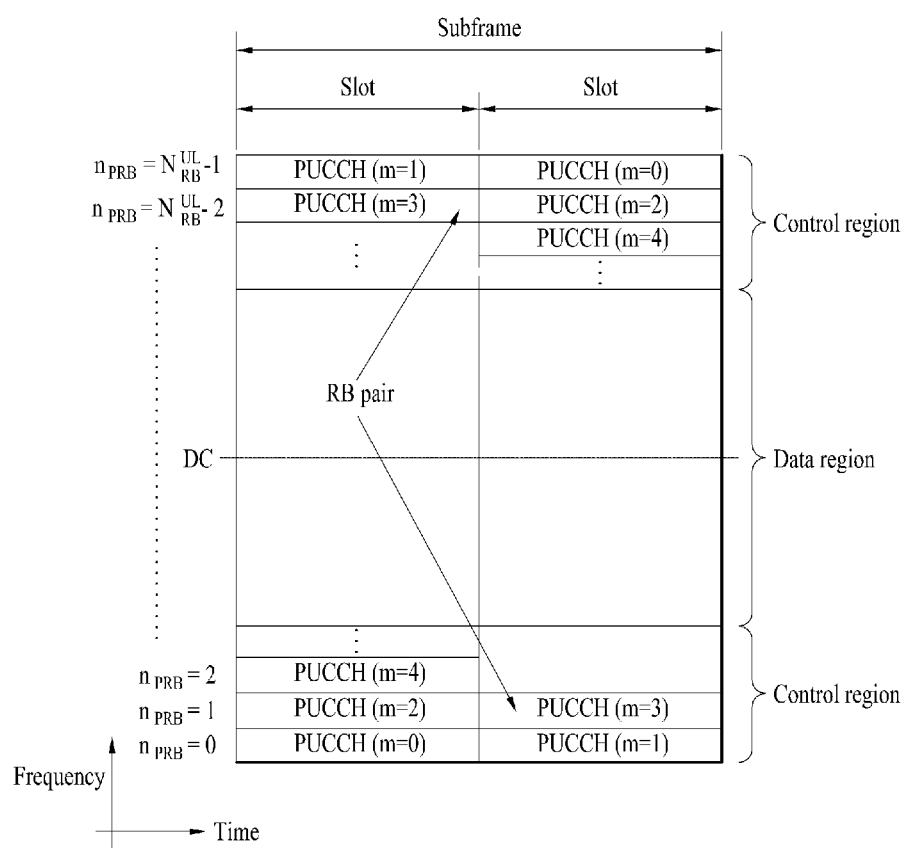
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (C SI) when a downlink DMRS is transmitted;

v) a multimedia broadcast single frequency network (MBSFN) reference signal transmitted for coherent demodulation of a signal transmitted in MB SFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

In new RAT (NR), an interference measurement method using not only an interference measurement resource (IMR) based on a conventional zero-power (ZP) CSI-RS but also a non-zero-power (NZP) CSI-RS or a DMRS has been considered. In particular, measurement of not only inter-cell interference in a CoMP environment but also intra-cell interference in a multi-user (MU) environment has been considered. For example, it may be considered that when a BS intends to measure interference due to a MU pair(s) expected for a specific UE, the BS informs the UE of an interference hypothesis, and more particularly, an IMR(s) given for inter-UE interference where MU pairing, which is expected in the MU environment, is assumed, and the UE measures interference using the corresponding IMR(s) and calculates and reports CSI based on the measured interference.

To perform measurement based on such an interference hypothesis, a method by which a BS performs interference emulation has been considered. In addition, a NZP CSI-RS and a DMRS have been considered as a resource for interference emulation. In the case of the NZP CSI-RS, although a BS may inform a flexible interference hypothesis, additional resources are required. In the case of the DMRS, no additional resource is required since a previously transmitted RS is used, and MU interference can be easily measured since actual data transmission is reflected. However, there is a disadvantage in that a BS may not easily perform interference emulation by assuming interference hypotheses in a flexible manner. The method may be performed by simply configuring a NZP CSI-RS based IMR and/or a DMRS based IMR or by configuring a ZP CSI-RS in a region for NZP CSI-RS transmission and/or a DMRS region. Alternatively, the following methods may be applied.

When interference is measured based on interference emulation, the number of MU layers when interference power is measured may be different from that when a UE is actually scheduled. As a result, measured interference power, $P_I'$ may be different from interference power at the scheduling time, $P_I$. In addition, since measured power on a desired channel, $P_D'$ is calculated/reported by assuming single-user (SU) operation at the corresponding UE, $P_D'$ and transmission power actually used by the UE at the scheduling time, $P_D$ are also affected by the number of (MU) layers. In this specification, the mark (') is added to parameters associated with the (interference) measurement time to distinguish them from parameters associated with the scheduling time. Although interference emulation is described based on a DMRS based IMR, the present disclosure is not limited to the DMRS based IMR.

Figure 5:
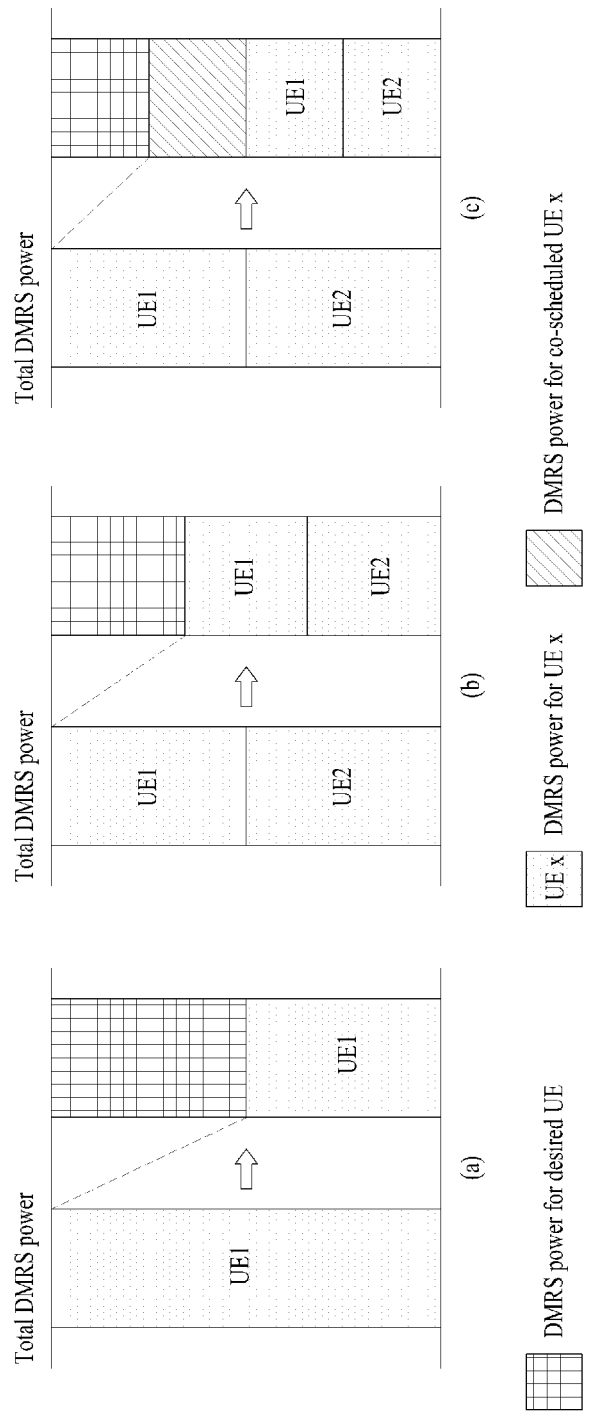
FIGS. 5, 6, 7, and 8 illustrate an interference power mismatch between a channel measurement time and a scheduling time.

1. Example 1 (FIG. 5(a)): In the case of MU-layer 1 at the interference measurement time and MU-layer 2 at the actual scheduling time (when a MU-CSI measuring UE that uses SU layer 1 enters)

A. Assuming that desired channel power at the interference measurement time is $P_D'$ and interference power at the interference measurement time is $P_I'$ B. At the actual scheduling time
  i. Desired channel power $P_D = \frac{1}{2} P_D'$
  ii. Interference power $P_I = \frac{1}{2} P_I'$ 2. Example 2 (FIG. 5(b)): In the case of MU-layer 2 at the interference measurement time and MU-layer 3 at the actual scheduling time (when a MU-CSI measuring UE that uses SU layer 1 enters)

A. At the actual scheduling time
  i. Desired channel power $P_D = \frac{1}{3} P_D'$
  ii. Interference power $P_I = \frac{2}{3} P_I'$ 3. Example 3 (FIG. 5(c)): In the case of MU-layer 2 at the interference measurement time and MU-layer 4 at the actual scheduling time (when a MU-CSI measuring UE that uses SU layer 1 enter together with another UE)

A. At the actual scheduling time
  i. Desired channel power $P_D = \frac{1}{4} P_D'$
  ii. Interference power Phd I=¾ $P_I'$ That is, when the number of layers at the measurement time is different from that at the scheduling time, a UE may experience different interference power.

In the LTE system, a power term for a NZP CSI-RS, P_c is defined for measurement of desired channel power, and the corresponding value is reflected in CSI calculation. However, if the transmission power of a NZP CSI-RS based IMR and/or a DMRS based IMR is provided to a UE through higher layer signaling such as RRC signaling for the same purpose, a proper value of P_c may not be provided for each interference measurement situation in time in an environment where interference is dynamically measured. To solve this problem, the present disclosure proposes the following method.

When a UE intending to calculate CQI at a measurement time is not scheduled, if desired channel power is measured using a NZP CSI-RS and interference power is measured using a DMRS resource where code division multiplexing (CDM) is applied, the number of MU layers that can be measured using the corresponding resource may be changed depending on CDM length. For example, in the case of a DMRS resource where CDM-4 is applied, a maximum of four layers may be MU-paired for UEs and transmitted on the corresponding resource. In this case, a BS may assume that the same power is used for each of the multiple layers.

To this end, the number of layers (expected) at the scheduling time, $l_s$ may be provided to the UE. The number of layers at the scheduling time may or may not include the number of UEs intending to calculate and report CQI, and it should be known to the UE and BS. In the present disclosure, it is assumed that the number of UEs intending to calculate/report CQI is included in $l_s$. If $l_s$ does not include the number of UEs intending to calculate/report CQI, $l_s$ may be replaced with $l_s\hat{}$ in the following equations under the condition of $l_s\hat{}=l_s+1$.

Figure 6:
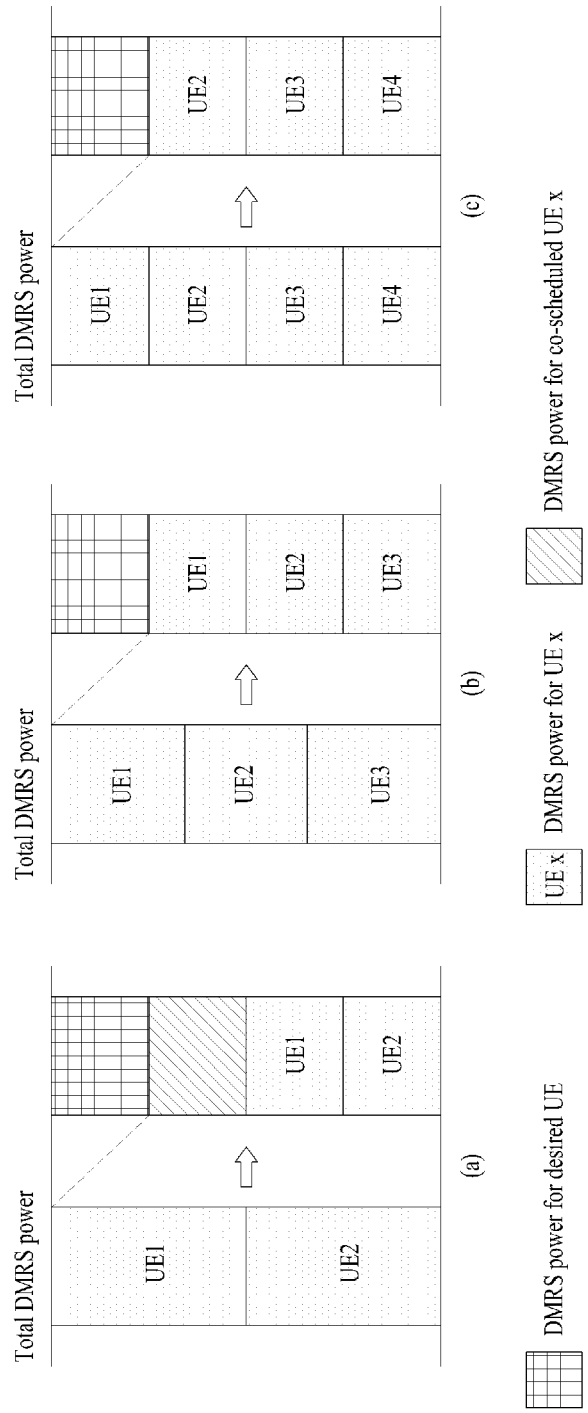
Figure 7:
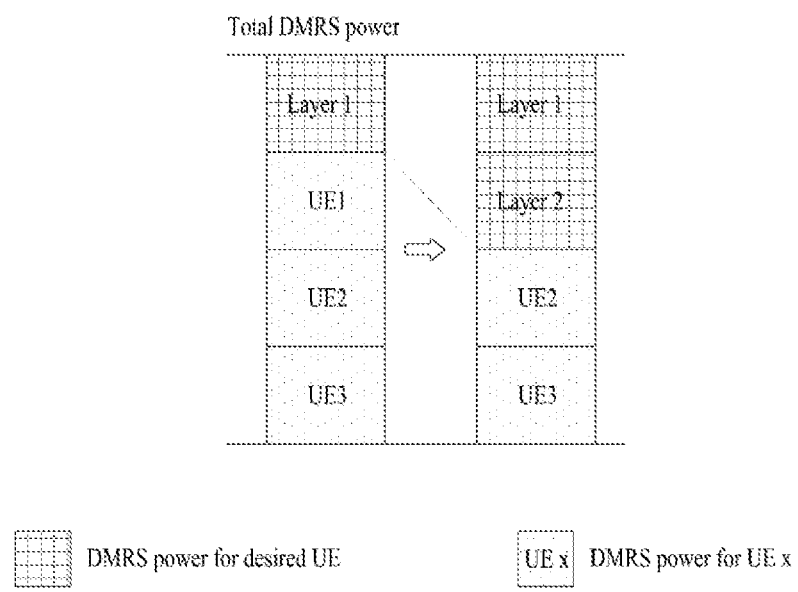

When $l_m'$ interference layers are transmitted at a measurement time and $l_s$ layers are to be transmitted at a scheduling time, if the number of transmission layers configured for a UE is $l_D$, interference power at the measurement time may satisfy the following equation: $P_I = P_I' \cdot ((l_s - l_D)/l_s)$. FIG. 6 shows an example when $l_m'=2, 3,$ or $4$, $l_s=4$, and $l_D=1$. In this case, the equation of $P_I = P_I' \cdot ((4-1)/4) = P_I' \cdot (3/4)$ is satisfied.

It may be established when DMRSs for individual UEs are beamformed. This is because since BS's transmission power is divided up between a desired UE and an interfering UE, the power of the beamformed DMRS is scaled by the same ratio as the corresponding power ratio.

Thus, if the BS informs $l_s$, the UE may adjust measured power as follows and then use the adjusted power in CQI calculation.

Desired channel power $P_D = P_D' \cdot (l_D/l_s)$

Interference power $P_I = P_I' \cdot ((l_s-l_D)/l_s)$

When the desired channel power/interference power is obtained from NZP CSI-RS measurement, the value of $P_D'/P_I'$ may be calculated by reflecting the value of P_c or the value a power adjustment parameter for interference power, P_cI.

Thus, the UE may calculate SINR as follows to calculate CQI where interference at the scheduling time is reflected.

$SINR = P_D \cdot (l_D/l_s)/\{P_I' \cdot ((l_s-l_D)/l_s) + N\}$, where N is noise power In the case of SINR' that uses the result at the measurement time with no change, the equation of $SINR = P_D'/\{P_I' + N\}$ is established.

That is, the following assumptions may be used for calculation thereof.

$P_I' = P_D' = P_{Rx}'(l_s' = l_m' = l_D')$ $P_D + P_I = P_{Rx}$ $P_{Rx}' \approx P_{Rx}$ As another method, the number of interference layer assumptions at a scheduling time, $l_m$ may be provided to a UE. The method may be used when a BS does not know $l_s$ at a scheduling time of the corresponding UE. In this case, the UE may perform CQI calculation by assuming that $l_s = l_m + l_D$. To this end, the BS may transmit the number of layer assumptions for the corresponding UE, $l_D$. In addition, if the BS does not know the number of interference layers at the scheduling time or is unable to expect the number of interference layers at the scheduling time, the BS may inform the UE of the number of (interference) layers at the measurement time, $l_m'$. Then, $l_m'$ may be used instead of $l_m$. If the UE does not know $l_D$ at the time when the UE needs to perform the CQI calculation, the UE may perform the CQI calculation by assuming that $l_D = 1$.

Assuming that corresponding interference is significantly larger than noise and other interference, SINR may be approximately calculated as follows.

$SINR \approx SINR' \cdot (l_D/l_s)/((l_s-l_D)/l_s) = SINR' \cdot l_D/(l_s-l_D)$ Accordingly, the BS may inform the UE the value of $l_s/l_m/l_D$ and/or $l_D/(l_s-l_D)$ as an SINR ratio.

More generally, when a UE intending to calculate/report CQI using the method proposed in the present disclosure is already scheduled at a measurement time, the number of desired channel layers/interference layers at a scheduling time needs to be considered.

When the corresponding UE is already scheduled as described above, if the UE intends to measure desired channel power using its given DMRS power, the UE may use the following assumptions.

$P_I' + P_D' = P_{Rx}'$ $P_I' = P_{Rx}' \cdot (l_m'/l_s') = P_{Rx}' \cdot ((l_s' - l_D')/l_s')$ $P_D' = P_{Rx}' \cdot ((l_D'/l_s')$ Thus, the calculation may be performed as follows.

Desired channel power $P_D = P_D' \cdot (l_D/l_s)(l_s'/l_D')$

Interference power $P_I = P_I' \cdot ((l_s = l_D)/l_s)(l_s'/(l_s-l_D'))$ $SINR = P_D' \cdot (l_D/l_s)(l_s'/l_D')/\{P_I' \cdot ((l_s-l_D)/l_s)(l_s'/(l_s'-l_D')) + N\}$, where N is noise power In this case, the total number of layers at the interference measurement time, $l_s'$ may be signaled to the UE. Since the UE already knows $l_D'$, no separate signaling is required.

Assuming that corresponding interference is significantly larger than noise and other interference, SINR may be approximately calculated as follows.

$SINR \approx SINR' \cdot (l_D/l_s)(l_s'/l_D')/((l_s-l_D)/l_s)(l_s'/(l_s'-l_D'))$
$= SINR' \cdot l_D(l_s'-l_D')/(l_D'(l_s-l_D))$ Accordingly, the BS may inform the UE the value of $l_s/l_m/l_D$ and/or $l_D(l_s'-l_D')/(l_D'(l_s-l_D))$ as an SINR ratio.

When the UE measures inference in a situation that the UE is not scheduled, it may be regarded as a special case where the following assumption is used. In this case, the above-described equations are applied.

$P_I' = P_D' = P_{Rx}'(l_s' = l_m' = l_D')$

When the UE measures its desired channel power using a separate resource such as a NZP CSI-RS and a separate measurement method, the UE may use the following assumption to calculate the desired channel power $P_D$.

$P_D' = P_{Rx}'(l_s' = l_m' = l_D')$

Thus, the calculation may be performed as follows.

Desired channel power $P_D = P_D' \cdot (l_D/l_s)$

Interference power $P_I = P_I' \cdot ((l_s-l_D)(l_s)(l_s'-l_D'))$ $SINR = P_D' \cdot (l_D/l_s)/\{P_I' \cdot ((l_s-l_D)/l_s)(l_s'-l_D')) + N\}$, where N is noise power $SINR \approx SINR' \cdot (l_D/l_s)/((l_s-l_D)/l_s)(l_s'/(l_s-l_D))$ may be provided to the UE as an In this case, the value of $l_D(l_s'-L_d')/(l_s'(l_s-l_D))$ may be provided to the UE as an SINR ratio.

When the UE measures its interference power using a separate resource such as a NZP CSI-RS and a separate measurement method, the UE may use the following assumption to calculate the interference power $P_I$.

$P_I' = P_{Rx}'(l_m' = l_s')$

Thus, the calculation may be performed as follows.

Desired channel power $P_D = P_D' \cdot (l_D/l_s)(l_s'/l_D')$

Interference power $P_I = P_I' \cdot ((l_s-l_s))$ $SINR = P_D' \cdot (l_D/l_s)(l_s'/l_D')/\{P_I' \cdot ((l_s-l_D)/l_s) + N\}$, where N is noise power $SINR \approx SINR' \cdot (l_D/l_s)(l_s'/l_D')/((l_s-l_D)/l_s) = SINR' \cdot l_D l_s'/(l_D'(l_s-l_D))$ In this case, the value of $l_D l_s'/(l_D'(l_s-l_D))$ may be provided to the UE as an SINR ratio.

Considering that DMRS-based interference measurement is performed based on actual DMRS transmission, it is desirable to dynamically provide the above-described parameters (e.g., $l_s/l_m'/l_D$) to the UE through DCI. However, if such degree of latency is not required, the parameters may be provided to the UE through MAC signaling or RRC signaling to reduce DCI overhead. The following parameters may also be signaled to the UE in a similar manner.

Instead of providing the number of layers, the ratio of DMRS power to be used for CSI calculation to measured DMRS power, $P_{C\_DMRS}$ may be signaled to a UE. This method may be used when different power is used for each layer unlike the above case. For example, the following equation may be established.

$$P_I = P_I' \cdot P_{C\_DMRS}$$

In this case, the desired channel power also varies depending on the number MU layers. Considering that $P_D = P_D' \cdot (1_D/1_s)$ and $P_I = P_I' \cdot ((1_s - 1_D)/1_s)$, it may be assumed that $P_D = P_D' \cdot (1 - P_{C\_DMRS})$.

$$P_I = P_I' \cdot P_{C\_DMRS}$$

$$P_D = P_D' \cdot (1 - P_{C\_DMRS})$$

$$SINR = P_D' \cdot (1 - P_{C\_DMRS})/(P_{C\_DMR} + N), \text{ where } N \text{ is noise power}$$

Alternatively, a BS may configure $P_{C\_DMRS}$ for a UE by considering a change in $P_D$ which depends on the number of layers. Accordingly, SINR may be calculated as follows.

$$SINR = P_D'/(P_I' \cdot P_{C\_DMRS} + N), \text{ where } N \text{ is noise power}$$

To adjust desired channel power, the ratio of DMRS power at a scheduling time to power of a transmitted RS (for measuring a desired channel), $P_{C\_Desired}$ may be signaled to a UE. In this case, $P_{C\_Desired}$ and SINR based on $P_{C\_Desired}$ may be defined as follows.

$$P_D = P_D \sqrt{P_{C\_Desired}}$$

$$SINR = P_D' \cdot P_{C\_Desired}/(P_I' \cdot P_{C\_DMRS} + N), \text{ where } N \text{ is noise power}$$

In this method, a BS may configure $P_{C\_Desired}$ for a UE by considering a change in $P_D$ which depends on the number of layers. Accordingly, SINR may be calculated as follows.

$$SINR = P_D' \cdot P_{C\_Desired}/(P_I' + N), \text{ where } N \text{ is noise power}$$

In particular, in the case of interference measurement using a NZP CSI-RS, the above value may be overridden and used instead of existing P_c or separately configured P_c for interference.

Assuming that corresponding interference is significantly larger than noise and other interference, SINR may be approximately calculated as follows.

$$SINR \approx SINR' \cdot P_{C\_Desired}/P_{C\_DMRS}$$

In this environment, the BS may inform the UE of the value of $P_{C\_Desired}/P_{C\_DMRS}$.

As in the case of signaling of the number of layers, it is desirable to dynamically provide the above-described parameters (e.g., $P_{C\_DMRS}$, $P_{C\_Desired}$, etc.) to the UE through DCI. However, if such degree of latency is not required, the parameters may be provided to the UE through MAC signaling or RRC signaling to reduce DCI overhead.

In the present disclosure, the above-described parameters for power adjustment may be provided together with DCI carrying a CSI measurement trigger and DCI carrying an interference measurement trigger in particular if signaling for a desired channel is different from that for interference measurement. Alternatively, if a CSI reporting trigger serves the same function, the parameters may be transmitted in DCI carrying the CSI reporting trigger.

In the present disclosure, if the parameters for power adjustment are configured by higher layer signaling, the corresponding configuration may be included in an IMR configuration/resource setting/measurement setting/reporting setting.

In the case of a frequency division multiplexed (FDMed) DMRS, a different DMRS port is defined for each FDMed DMRS resource, and different interference power is expected for each DMRS port. In particular, since measuring interference at ports unused by a BS is meaningless, it is desirable that power is measured for each DMRS port by measuring MU interference for each FDMed DMRS resource. To this end, the BS may inform a UE of a resource corresponding to a measurement target among FDMed DMRS resources. If there is no separate signaling, the UE may attempt interference measurement on all FDMed DMRS resources. To this end, regarding a DMRS based IMR, interference measurement operation needs to be defined separately for each DMRS port or each FDMed resource. Alternatively, if the MU interference is measured at DMRS locations using a ZP CSI-RS based IMR, the interference measurement operation needs to be defined for each DMRS port location in the same ZP CSI-RS resource.

To this end, the IMR configuration may be established as follows. As the measurement setting, it may be linked to a NZP CSI-RS and/or a DMRS, or a ZP CSI-RS may be configured at the location in which the DMRS/NZP CSI-RS is to be transmitted. Then, interference measurement may be performed on the corresponding resources at a time indicated by separate dynamic signaling or configured by higher layer signaling.

In this case, to measure per-layer interference for each DMRS port, a ZP CSI-RS based IMR may be configured separately for each port, and then the per-layer interference may be measured for each resource. If this operation is performed on a resource (e.g., FDMed resource) basis, which is different from the port, or on a resource-group basis, the ZP CSI-RS based IMR may be configured separately for each resource (or resource group). In this case, multiple IMRs may be used to calculate one piece of CSI.

The IMR may be composed of different resources. Alternatively, in the case of the same type of IMR (e.g., ZP CSI-RS/NZP CSI-RS/DMRS based IMR), a different interference measurement method may be used. For example, even when the ZP CSI-RS based IMR is used from the perspective of a UE, a BS may emulate and transmit per-layer interference for each port or predetermined resource unit (for example, every two REs on the same subcarrier) within the same IMR, instead of using the conventional interference power measurement method. In this case, the BS should inform the UE of the corresponding operation. To this end, an 'interference measurement method indicator' (IMMI) may be included in the IMR configuration/resource setting/measurement setting/reporting setting so that it may be indicated that the corresponding IMR is the DMRS based IMR, NZP CSI-RS based IMR, or ZP CSI-RS based IMR. In this case, whether the DMRS based IMR, NZP CSI-RS based IMR, or ZP CSI-RS based IMR is used may be determined by a resource which is actually used by the BS or UE or an interference measurement method. In other words, in the case of the same type of ZP CSI-RS based IMR, the 'DMRS based IMR' may be configured by the IMMI to use a DMRS-like interference measurement method. For example, when the IMMU indicates the 'DMRS based IMR', MU interference may be measured for each DMRS port. When the IMMI indicates the 'ZP CSI-RS based IMR', power measured for the entirety of a corresponding resource (specifically, in the case of a resource above the RB level, it may be divided into subbands/partial bands/widebands) may be regarded as interference power. When the IMMU indicates the 'NZP CSI-RS based IMR', an interference channel may be measured. To reduce additional signaling overhead, similar or overlapping states may be signaled as one state. For example, if a DMRS and a NZP CSI-RS have the same resource configuration in terms of interference measurement, the IMMI may indicate either an emulation based IMR (i.e., DMRS based IMR or NZP CSI-RS based IR) or a non-emulation based IMR.

Alternatively, the IMMI may be signaled to the UE through DCI so that the corresponding resource may be used more flexibly.

For this operation, in the case of the ZP CSI-RS/NZP CSI-RS based IMR, which is configured at a location different from that of the DMRS, if the NZP CSI-RS that emulates DMRS transmission at a specific time in future (e.g., at an estimated scheduling time) is transmitted, the UE may perform the interference measurement using the corresponding resource in a similar manner to the DMRS-based IMR. In particular, in this case, the UE may transmit its DMRS together and calculate and report CQI for MU CQI adjustment by simultaneously measuring desired power and interference. This operation may be better performed by 'desired port' signaling.

When the order of using resources is defined for each layer, if the number of layers at a measurement time, lm is signaled as described above, FDMed DMRS resources and/or ports where interference measurement is to be performed may be informed. Alternatively, when CDM and FDM are simultaneously used, the number of FDMed resources where a UE attempts the interference measurement, nFDM may be signaled to the UE.

When a UE attempts blind detection (BD) to measure per-layer interference power for each DMRS port, the above-described signaling may be used. For example, a BS may signal to the UE the number of transmission layers at the corresponding time, lm, and the UE may measure and use interference power for each of the $l_m$ indicated DMRS ports. In this case, the BS may reduce the number of DMRS layers where the UE attempts the BD by transmitting the number of significant interference layers (significant interference layer number), $l_{m\_sig}$ instead of $l_m$.

When CDM and FDM are simultaneously applied to a DMRS, that is, when two or more DMRS ports are code division multiplexed (CDMed) on FDMed DMRS resources, interference power may be measured for each port or each FDMed resource, instead of averaging interference power measured for all DMRS resources. This may be used for inter-layer interference, and more particularly, for MU interference. In this case, some or all of the parameters for power adjustment may be transmitted separately for each port and/or FDMed DMRS resource where the interference measurement is to be attempted. Further, a parameter within a corresponding resource rather than all resources (e.g., the total number of layers in an FDMed DMRS resource at a measurement time/the number of desired channel layers/the number of interference layers) may be used instead thereof.

Figure 8:
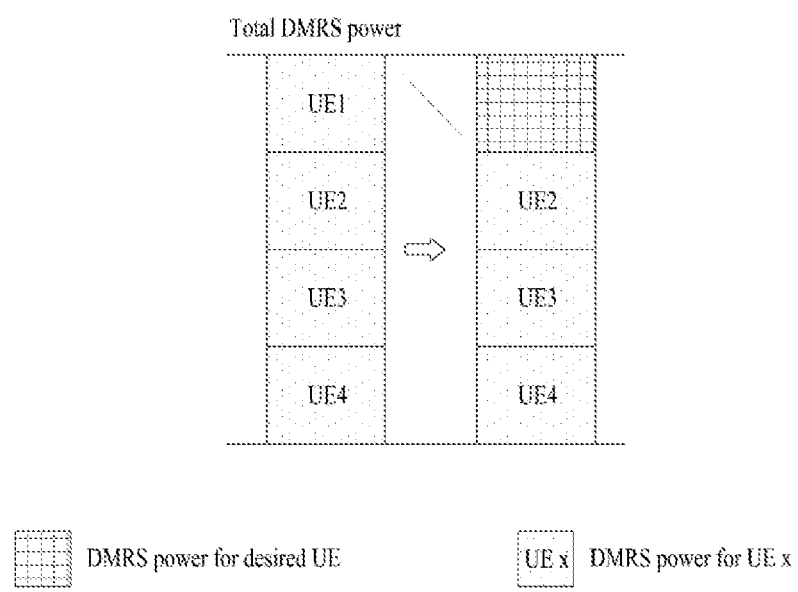

It may be considered that a desired UE is scheduled in a specific interference layer so that an existing UE is replaced with the desired UE. FIG. 8 illustrates an example in which a desired UE enters into the interference layer for UE 1 instead of UE 1 when a CDMed DMRS is used.

In this case, Pi cannot be accurately adjusted by simple scaling. In the case of a beamformed DMRS, the interference channel of UE 1 is similar to the channel of the desired UE, and thus, the interference power of UE 1 is eliminated at an actual scheduling time although the largest interference is created.

Therefore, in this case, a BS may inform a UE of a DMRS port that may become a desired channel or a DMRS resource for transmission on the correspond port. The UE may regard the power measured at the corresponding DMRS port (or resource) as desired channel power $P_D'$ and regard the remaining power except the power measured at the corresponding DMRS port as interference power $P_I'$. In this case, since a kind of 'MU CQI measurement resource' is defined on a DMRS, the UE may report a value for adjusting MU CQI or existing CQI by measuring the desired channel power/interference power on one configured resource. To this end, the BS may transmit a kind of dummy DMRS port to the corresponding UE at a corresponding measurement time. If this operation is implemented by emulation using a NZP CSI-RS, a resource for transmitting the UE's desired channel may be defined as a specific port (e.g., the location of the first DMRS port within a configured IMR) and/or resource without separate signaling.

The amount of the interference power may be changed at the boundary of a PRB bundle where the transmission precoder of the DMRS may be changed. Thus, the BS may inform the UE of a PRB bundling size, and the UE may measure the interference power for each bundle.

If a resource group is defined for DMRS resources, the above-described resource-related operation may be equally applied to the resource group. The resource group may be separately configured for interference measurement or for other purposes. This may be configured through higher layer signaling such as RRC signaling.

The resource configuration for interference measurement may be made based on a NZP CSI-RS based IMR, a DMRS based IMR, or a ZP CSI-RS based IMR(s) configured on a corresponding resource. In particular, in the case of the DMRS based IMR, interference may be measured for the frequency granularity (e.g., wideband, partial band, subband, etc.) configured for the corresponding IMR, regardless of the actual scheduling band of a DMRS. Alternatively, the frequency granularity of an RS for measuring a desired channel, e.g., a NZP CSI-RS may be used instead of the configured frequency granularity. On the contrary, the NZP CSI-RS based IMR/DMRS based IMR may be limited to a specific frequency granularity, for example, a partial band. Each frequency granularity may be defined as follows.

Partial band: Bands for specific services that the UE is currently operating, within wideband.)

Subband: Bands where the UE can be scheduled within the partial band

Wideband: The largest bandwidth supported by the UE

In this case, a partial band CSI-RS may be preconfigured by higher layer signaling (e.g., RRC signaling). Alternatively, since the partial band may correspond to a frequency resource with different system numerology such as a TTI, a subframe/slot length, a subcarrier spacing, etc., which is to support a different service from the perspective of the physical layer, the partial band may be defined as follows.

Partial band: The largest bandwidth supported by the UE with the same numerology (e.g., slot/subframe length, TTI, subcarrier spacing) within the wideband If carrier aggregation is considered, it is more natural that CSI is defined separately for each component carrier. Thus, the following definition may be more accurate.

Wideband: The largest bandwidth supported by the UE per component carrier

The above-described methods may be applied independently or in combination. In addition, although the methods are explained based on the CDMed DMRS port/FDMed DMRS port for convenience of description, the present disclosure can be applied regardless of how DMRS ports are multiplexed. Moreover, among the methods, the method based on the DMRS based IMR can be applied to the NZP/ZP CSI-RS based IMR in the same way. Further, the above-described MU CQI may be applied to an IMR used for aperiodic CSI, and more particularly, to an aperiodic IMR. Although the present disclosure focuses on the MU interference, the disclosure can be applied in a similar way when CSI is calculated in consideration of other types of interference, for example, inter-cell interference. The methods can also be applied to other interference reporting methods, for example, when interference is jointly reported without using CQI or when interference is reported only.

Figure 9:
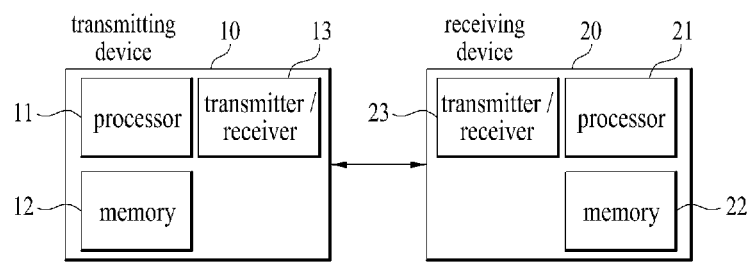
FIG. 9 is a block diagram for a device configured to implement embodiment(s) of the present disclosure.

FIG. 9 is a block diagram of a transmitting device 10 and a receiving device 20 configured to implement exemplary embodiments of the present disclosure. Referring to FIG. 9, the transmitting device 10 and the receiving device 20 respectively include transmitter/receiver 13 and 23 for transmitting and receiving radio signals carrying information, data, signals, and/or messages, memories 12 and 22 for storing information related to communication in a wireless communication system, and processors 11 and 21 connected operationally to the transmitter/receiver 13 and 23 and the memories 12 and 22 and configured to control the memories 12 and 22 and/or the transmitter/receiver 13 and 23 so as to perform at least one of the above-described embodiments of the present disclosure.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present disclosure. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present disclosure is implemented using firmware or software, firmware or software may be configured to include modules, procedures, functions, etc. performing the functions or operations of the present disclosure. Firmware or software configured to perform the present disclosure may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator. The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 10 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receiver 13 and 23 include one or more antennas. An antenna performs a function of transmitting signals processed by the transmitter/receiver 13 and 23 to the exterior or receiving radio signals from the exterior to transfer the radio signals to the transmitter/receiver 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. A transmitter/receiver supporting a MIMO function of transmitting and receiving data using a plurality of antennas may be connected to two or more antennas.

In embodiments of the present disclosure, a UE serves as the transmission device 10 on uplink and as the receiving device 20 on downlink. In embodiments of the present disclosure, an eNB serves as the receiving device 20 on uplink and as the transmission device 10 on downlink.

The transmitting device and/or the receiving device may be configured as a combination of one or more embodiments of the present disclosure.

As one of the embodiments, provided is a UE for performing channel state measurement in a wireless communication system. The UE may include a transmitter, a receiver, and a processor configured to control the transmitter and the receiver. The processor may be configured to receive, from a BS, a resource configuration related to an RS for the channel state measurement, receive information on the number of transmission layers of the BS at a channel state measurement time or the number of transmission layers of the BS at a scheduling time based on the channel state measurement, and perform the channel state measurement using the received information.

The number of transmission layers may include the number of transmission layers for a desired signal for the UE, the number of transmission layers for an interference signal for the UE, or the number of total transmission layers used by the BS for transmission.

The information on the number of transmission layers may be received together with DCI for triggering the channel state measurement or interference measurement.

When an FDMed DMRS is used as the RS, the processor may be configured to receive information on a resource on which the channel state measurement is to be performed among resources for the FDMed DMRS, and in this case, each of the resources for the DMRS may be configured for each port for the DMRS.

The processor may be configured to receive, from the BS, information on the number of FDMed resources for interference measurement.

The information on the number of transmission layers may be provided for each antenna port on which the RS is transmitted or for each FDMed resource.

As mentioned in the foregoing description, the detailed descriptions for the preferred embodiments of the present disclosure are provided to allow those skilled in the art to implement and embody the present disclosure. While the present disclosure has been described and illustrated herein with reference to the preferred embodiments thereof, it will be apparent to those skilled in the art that various modifications and variations can be made therein without departing from the spirit and scope of the disclosure. Therefore, the present disclosure is not limited by the embodiments disclosed herein but intends to give the broadest scope matching the principles and new features disclosed herein.

INDUSTRIAL APPLICABILITY

The present disclosure may be used for a wireless communication apparatus such as a user equipment (UE), a relay, and an eNB.

The invention claimed is:

1. A method of channel state measurement performed by a user equipment (UE) operating in a wireless communication system, the method comprising:
receiving, from a base station, a resource configuration related to a reference signal for channel state measurement;
receiving information regarding a number of significant interference layers of the base station at a channel state measurement time; and
performing the channel state measurement by using blind detection of an interference signal based on the number of significant interference layers and the resource configuration,
wherein the number of significant interference layers is less than a total number of layers of the base station at the channel state measurement time.

2. The method of claim 1, wherein the information regarding the number of significant interference layers is received together with downlink control information for triggering the channel state measurement.

3. The method of claim 1, further comprising:
based on a frequency division multiplexed demodulation reference signal being used as the reference signal, receiving information regarding a resource on which the channel state measurement is to be performed among resources for the frequency division multiplexed demodulation reference signal, wherein each of the resources for the demodulation reference signal is configured for each port for the demodulation reference signal.

4. The method of claim 1, further comprising receiving, from the base station, information regarding a number of frequency division multiplexed resources for interference measurement.

5. The method of claim 1, wherein the information regarding the number of significant interference layers is provided for each antenna port on which the reference signal is transmitted or for each frequency division multiplexed resource.

6. A user equipment (UE) configured to perform channel state measurement in a wireless communication system, the UE comprising:
a transmitter;
a receiver; and
a processor configured to control the transmitter and the receiver,
wherein the processor is configured to:
receive, from a base station, a resource configuration related to a reference signal for the channel state measurement;
receive information regarding a number of significant interference layers of the base station at a channel state measurement time; and
perform the channel state measurement by using blind detection of an interference signal based on the number of significant interference layers and the resource configuration,
wherein the number of significant interference layers is less than a total number of layers of the base station at the channel state measurement time.

7. The UE of claim 6, wherein the information regarding the number of significant interference layers is received together with downlink control information for triggering the channel state measurement.

8. The UE of claim 6, wherein the processor is further configured to:
based on a frequency division multiplexed demodulation reference signal being used as the reference signal, receive information regarding a resource on which the channel state measurement is to be performed among resources for the frequency division multiplexed demodulation reference signal, and wherein each of the resources for the demodulation reference signal is configured for each port for the demodulation reference signal.

9. The UE of claim 6, wherein the processor is further configured to receive, from the base station, information regarding a number of frequency division multiplexed resources for interference measurement.

10. The UE of claim 6, wherein the information regarding the number of significant interference layers is provided for each antenna port on which the reference signal is transmitted or for each frequency division multiplexed resource.

11. The method of claim 1, wherein the UE is a part of an autonomous driving device.

* * * * *